(12) United States Patent
Srivastava

(10) Patent No.: US 11,570,655 B2
(45) Date of Patent: Jan. 31, 2023

(54) ALLOCATING A PHYSICAL RADIO RESOURCE FOR A NONGUARANTEED BIT RATE BEARER IN A DISTRIBUTED COMMUNICATIONS SYSTEM

(71) Applicant: Corning Research & Development Corporation, Corning, NY (US)

(72) Inventor: Swami Dayal Srivastava, Gurgaon (IN)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 4 days.

(21) Appl. No.: 16/915,462

(22) Filed: Jun. 29, 2020

(65) Prior Publication Data
US 2021/0410000 A1 Dec. 30, 2021

(51) Int. Cl.
*H04W 28/02* (2009.01)
*H04W 28/08* (2009.01)
*H04W 72/04* (2009.01)
*H04L 47/24* (2022.01)
*H04W 28/10* (2009.01)

(52) U.S. Cl.
CPC ......... *H04W 28/0268* (2013.01); *H04L 47/24* (2013.01); *H04W 28/0933* (2020.05); *H04W 28/10* (2013.01); *H04W 72/0486* (2013.01)

(58) Field of Classification Search
CPC ......... H04W 28/0268; H04W 28/0933; H04W 28/10; H04W 72/0486; H04L 47/24
See application file for complete search history.

(56) References Cited

U.S. PATENT DOCUMENTS

| | | | |
|---|---|---|---|
| 10,390,255 B2 | 8/2019 | Franklin et al. | |
| 2015/0264596 A1 | 9/2015 | Franklin et al. | |
| 2015/0282152 A1* | 10/2015 | Wang | H04W 28/0815 370/329 |
| 2016/0142933 A1* | 5/2016 | Rastogi | H04W 72/1247 370/230 |
| 2020/0389907 A1* | 12/2020 | Jeon | H04W 72/087 |

* cited by examiner

*Primary Examiner* — Marcus Smith
(74) *Attorney, Agent, or Firm* — William D. Doyle

(57) ABSTRACT

Allocating a physical radio resource for a non-guaranteed bit rate (non-GBR) bearer in a distributed communications system (DCS) is disclosed. More specifically, the method enables a radio circuit in a network node to divide the physical radio resource among a number of non-GBR quality-of-service (QoS) class identifiers (QCIs) based on a number of predetermined scheduling ratios, respectively. The radio circuit can be configured to dynamically rebalance physical radio resource allocation among the non-GBR QCIs such that the network node can maintain the predetermined scheduling ratios or respond to a reconfiguration of the predetermined scheduling ratios among the non-GBR QCIs. As a result, a network operator(s) can dynamically adjust physical radio resource allocation among the non-GBR QCIs based on, for example, subscribers' network usage and plan limits, thus making it possible for the network operator(s) to customize QoS configuration to enable differentiated non-GBR services.

24 Claims, 10 Drawing Sheets

ALLOCATING A PHYSICAL RADIO RESOURCE FOR A NONGUARANTEED BIT RATE BEARER IN A DISTRIBUTED COMMUNICATIONS SYSTEM

BACKGROUND

The disclosure relates generally to allocating a radio resource for a non-guaranteed bit rate (non-GBR) bearer in a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a distributed communications system (DCS) 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the DCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the DCS 100 in FIG. 1 may be configured to support service providers 104(1)-104(N) that have a different frequency spectrum and do not share the spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a distributed communications system, such as a distributed antenna system (DAS), such that the radio circuits 118(1)-118(N) remotely distribute the downlink communications signals 110(1)-110(N) of the multiple service providers 104(1)-104(N) to remote units. The remote units each include an antenna that may be similar to the antenna 112 in FIG. 1 for radiating the downlink communications signals 110(1)-110(N) to subscribers. Notably, each of the remote units may be configured to communicate the downlink communications signals 110(1)-110(N) in one or more frequency bands. In addition, each of the remote units may also be configured to receive uplink communications signals in one or more frequency bands.

No admission is made that any reference cited herein constitutes prior art. Applicant expressly reserves the right to challenge the accuracy and pertinency of any cited documents.

SUMMARY

Embodiments disclosed herein include allocating a physical radio resource for a non-guaranteed bit rate (non-GBR) bearer in a distributed communications system (DCS). More specifically, the method enables a radio circuit in a network node (e.g., base station, central unit, radio node, remote unit, etc.) to divide the physical radio resource among a number of non-GBR quality-of-service (QoS) class identifiers (QCIs) based on a number of predetermined scheduling ratios, respectively. The radio circuit can be configured to dynamically rebalance physical radio resource allocation among the non-GBR QCIs such that the network node can maintain the predetermined scheduling ratios or respond to a reconfiguration of the predetermined scheduling ratios among the non-GBR QCIs. As a result, a network operator(s) can dynamically adjust physical radio resource allocation among the non-GBR QCIs based on, for example, subscribers' network usage and plan limits, thus making it possible for the network operator(s) to customize QoS configuration to enable differentiated non-GBR services.

One exemplary embodiment of the disclosure relates to allocating a physical radio resource for a non-GBR bearer in a DCS. The method includes receiving a scheduling ratio set comprising a plurality of predetermined scheduling ratios for dividing a physical radio resource among a plurality of non-GBR QCIs. The physical radio resource comprises a plurality of resource blocks (RBs) and each of the plurality of non-GBR QCIs is associated with one or more logical channels. The method also includes determining a plurality of resource division ratios (RDRs) for the plurality of non-GBR QCIs, respectively, based at least on the received scheduling ratio set. The method also includes determining a plurality of current scheduling ratios (CSRs) for the plurality of non-GBR QCIs, respectively. The method also includes determining one or more under-scheduled non-GBR QCIs among the plurality of non-GBR QCIs based on the plurality of RDRs and the plurality of CSRs. The method also includes allocating the plurality of RBs to each of the one or more under-scheduled non-GBR QCIs.

An additional exemplary embodiment of the disclosure relates to a DCS. The DCS includes a radio circuit. The radio circuit includes an interface circuit. The interface circuit is configured to receive a scheduling ratio set comprising a plurality of predetermined scheduling ratios for dividing a physical radio resource among a plurality of non-GBR QCIs. The physical radio resource comprises a plurality of RBs and each of the plurality of non-GBR QCIs is associated with one or more logical channels. The radio circuit also includes a processing circuit. The processing circuit is configured to determine a plurality of RDRs for the plurality of non-GBR QCIs, respectively, based at least on the received scheduling ratio set. The processing circuit is also configured to determine a plurality of CSRs for the plurality of non-GBR QCIs, respectively. The processing circuit is also configured to determine one or more under-scheduled non-GBR QCIs among the plurality of non-GBR QCIs based on the plurality of RDRs and the plurality of CSRs. The processing circuit is also configured to allocate the plurality of RBs to each of the one or more under-scheduled non-GBR QCIs.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include allocating a physical radio resource for a non-guaranteed bit rate (non-GBR) bearer in a distributed communications system (DCS). More specifically, the method enables a radio circuit in a network node (e.g., base station, central unit, radio node, remote unit, etc.) to divide the physical radio resource among a number of non-GBR quality-of-service (QoS) class identifiers (QCIs) based on a number of predetermined scheduling ratios, respectively. The radio circuit can be configured to dynamically rebalance physical radio resource allocation among the non-GBR QCIs such that the network node can maintain the predetermined scheduling ratios or respond to a reconfiguration of the predetermined scheduling ratios among the non-GBR QCIs. As a result, a network operator(s) can dynamically adjust physical radio resource allocation among the non-GBR QCIs based on, for example, subscribers' network usage and plan limits, thus making it possible for the network operator(s) to customize QoS configuration to enable differentiated non-GBR services.

Figure 1:
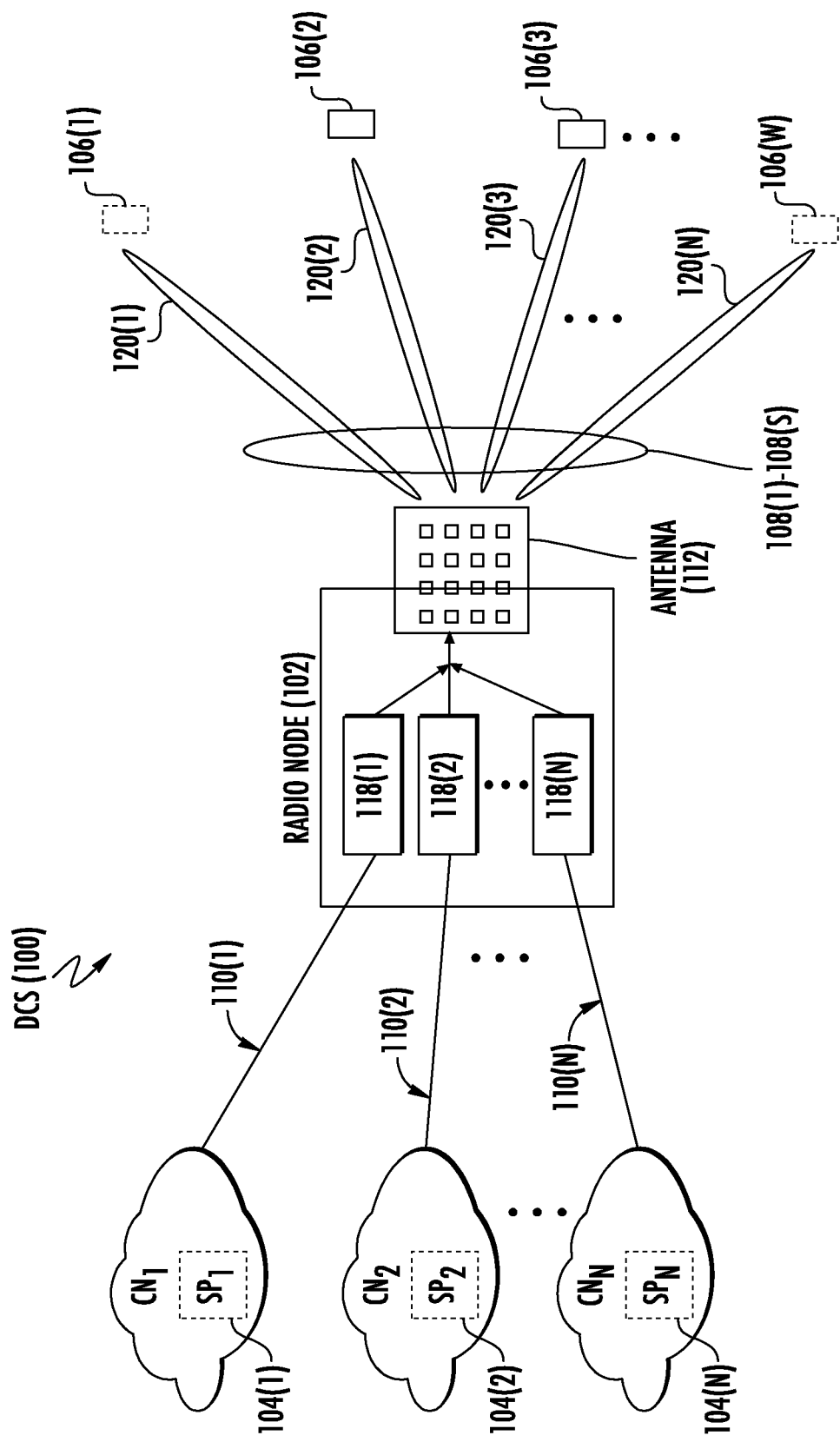
FIG. 1 is a schematic diagram of an exemplary distributed communications system (DCS) that includes a conventional single operator radio node configured to support distribution of communications signals for multiple service providers.
Figure 2:
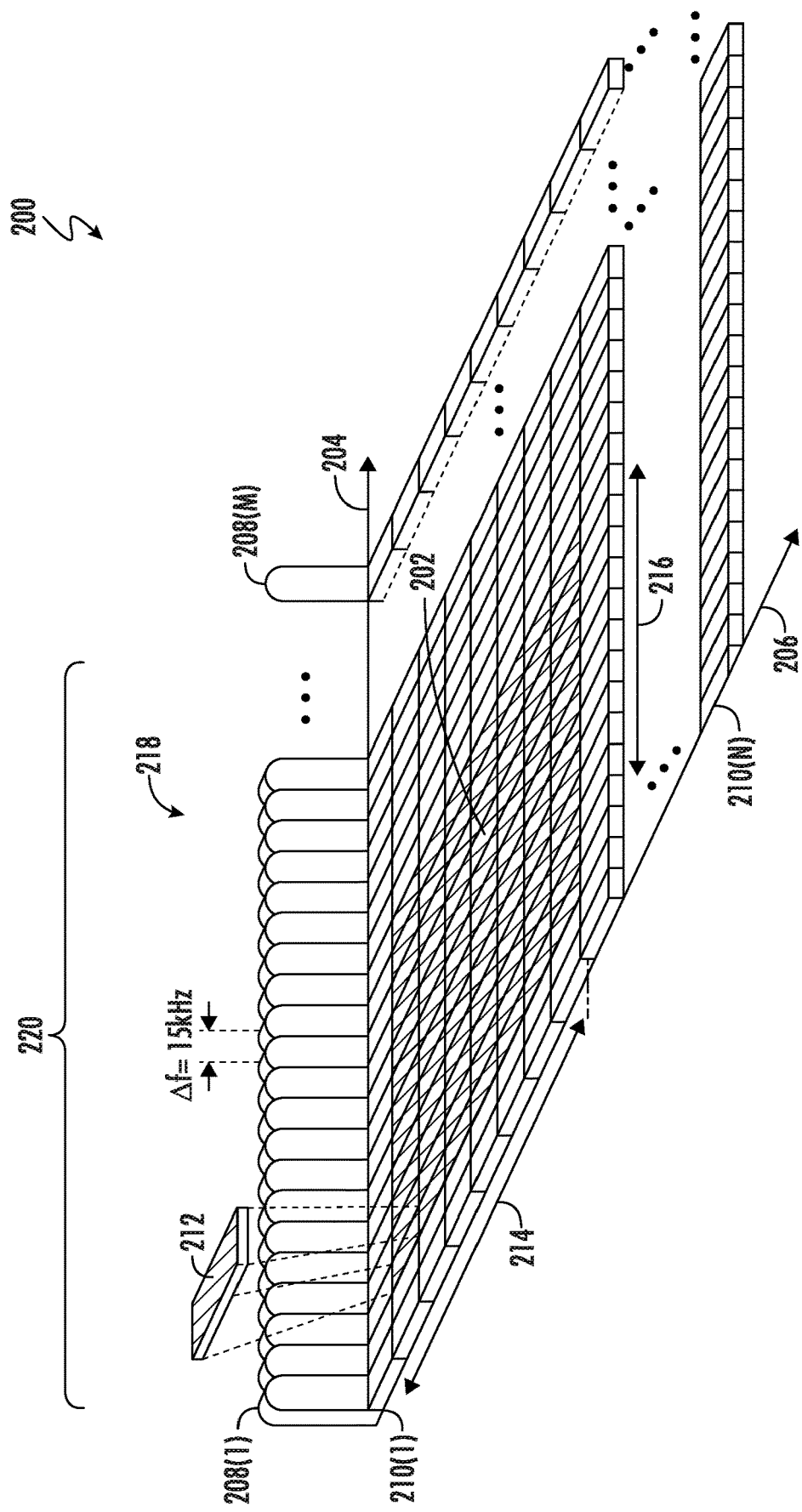
FIG. 2 is a schematic diagram of an exemplary orthogonal frequency division multiplexing (OFDM) time-frequency grid illustrating at least one resource block (RB)
Figure 3:
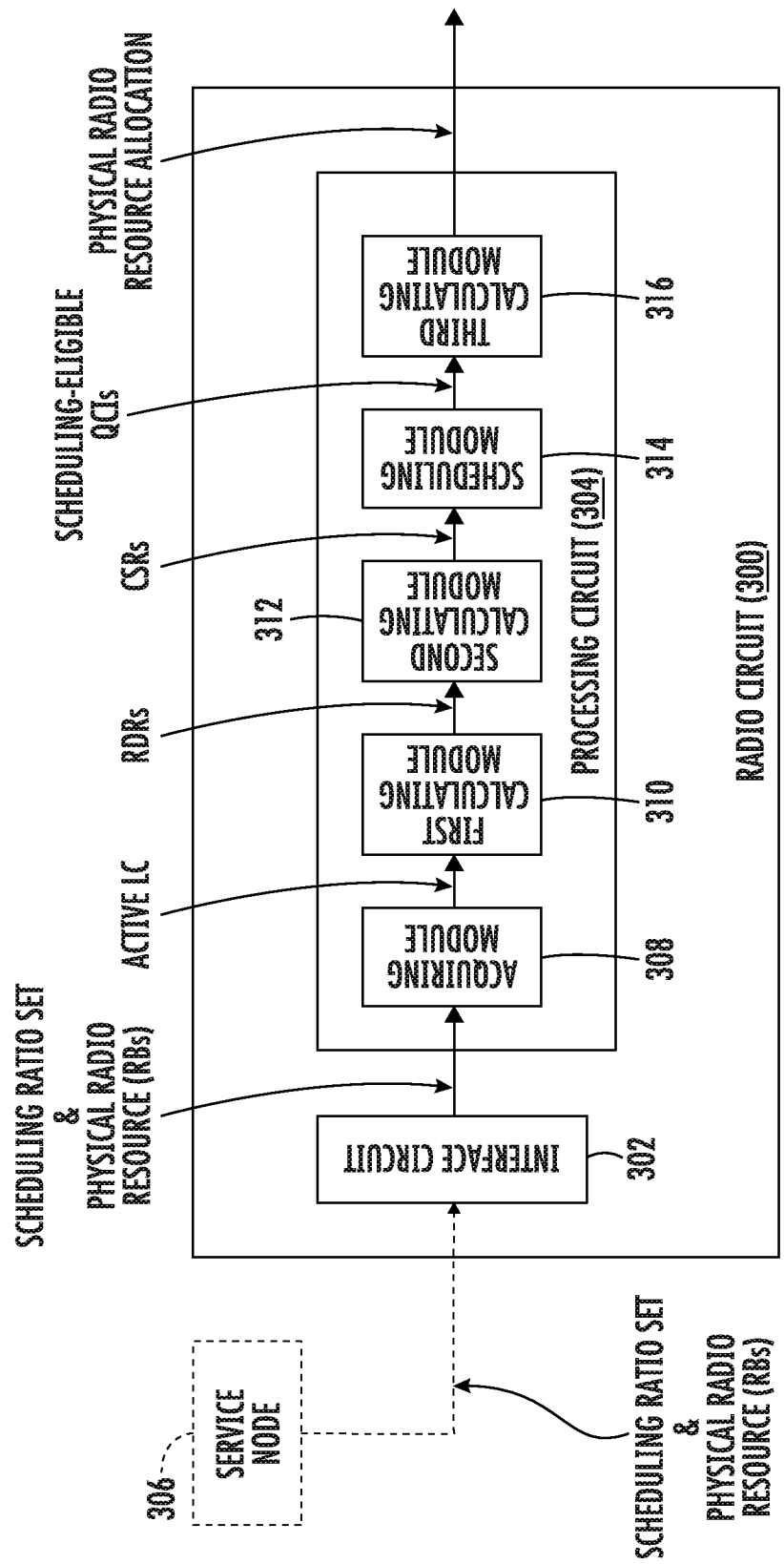
FIG. 3 is a schematic diagram of an exemplary radio circuit configured to enable physical radio resource allocation for a non-guaranteed bit rate (non-GBR) bearer.

Before discussing dynamically allocating the physical radio resource for the non-GBR bearer according to the present disclosure, starting at FIG. 3, a brief overview of physical and logical radio resource allocations, along with QoS classification, in a wireless communications network, such as Long-Term Evolution (LTE) and Fifth Generation New Radio (5G-NR) networks, is first provided with reference to FIG. 2.

In this regard, FIG. 2 is a schematic diagram of an exemplary Orthogonal Frequency Division Multiplexing (OFDM) time-frequency grid 200 illustrating at least one Resource Block (RB) 202. The OFDM time-frequency grid 200 includes a frequency-domain axis 204 and a time-domain axis 206. Along the frequency-domain axis 204, there are a number of subcarriers 208(1)-208(M). The subcarriers 208(1)-208(M) are orthogonally separated from each other by a frequency spacing Δf (e.g., 15 KHz). Along the time-domain axis 206, there are a number of OFDM symbols 210(1)-210(N). Each intersection of the subcarriers 208(1)-208(M) and the OFDM symbols 210(1)-210(N) defines a resource element (RE) 212. The subcarriers 208 (1)-208(M) along the frequency-domain axis 204 and the OFDM symbols 210(1)-210(N) along the time-domain axis 206 are collectively referred to as physical radio resources of the wireless communications network.

In one non-limiting example, the RB 202 includes twelve (12) consecutive subcarriers among the subcarriers 208(1)-208(M), and fourteen (14) consecutive OFDM symbols among the OFDM symbols 210(1)-210(N). In this regard, the RB 202 includes one hundred sixty-eight (168) of the REs 212 (12 subcarriers×14 OFDM symbols). The RB 202 has an RB duration 214, which equals one-half of a millisecond (0.5 ms), along the time-domain axis 206. The RB duration 214 is commonly referred to as a slot or a time slot. Accordingly, the RB 202 has a bandwidth 216, which equals 180 KHz (15 KHz/subcarrier×12 subcarriers), along the frequency-domain axis 204. In OFDM-based communication systems like LTE and 5G-NR, the RB 202 is the minimum unit for allocating the physical radio resource to a user equipment (UE). Herein, the UE is an electronic device (e.g., smartphone, tablet, laptop computer, etc.) having a radio interface(s) and a processing circuit(s) for enabling wireless communications via radio access technology (RAT), such as LTE and 5G-NR.

The physical radio resource is organized into a number of physical channels, such as a physical downlink control channel (PDCCH) for carrying downlink control traffic and a physical downlink shared channel (PDSCH) for carrying downlink data traffic. Each of the physical channels includes a selected number of the RBs 202 to be shared among a number of UEs in a coverage cell for carrying various types of medium access control (MAC) layer traffic.

In LTE and 5G-NR, each type of the MAC layer traffic is identified by a logical channel. Herein, a logical channel can be construed as a logical representation of a specific type of a higher layer traffic, such as the MAC layer traffic. For example, unicast data traffic and multicast data traffic are two different types of MAC layer traffic. Accordingly, the unicast data traffic and the multicast data traffic can be identified by two different logical channels known as a dedicated traffic channel (DTCH) and a multicast traffic channel (MTCH), respectively. Both the DTCH and the MTCH are mapped to the PDSCH. In this regard, the RBs 202 allocated to the PDSCH are shared by the DTCH and the MTCH.

Each UE may be capable of concurrently supporting a variety of applications associated with different QoS requirements. Some types of applications (e.g., voice call, banking transaction, emergency and/or medical alert, etc.) are time-critical and may demand a guaranteed bit rate (GBR) from the network to satisfy a more stringent QoS requirement(s). Accordingly, a network node (e.g., base station) provides a guaranteed minimum bit rate for the time-critical applications to exchange GBR data traffic with the network node.

In contrast, some other types of applications (e.g., internet browsing, file download, email, etc.) are less time-critical and may tolerate a non-guaranteed bit rate (non-GBR) due to a more relaxed QoS requirement(s). Accordingly, the network node provides no guaranteed minimum bit rate for the less time-critical applications to exchange non-GBR data traffic with the network node.

To enable differentiated treatment for the GBR traffic and the non-GBR traffic, a set of network configurations has been defined for the GBR traffic and the non-GBR traffic, respectively. Herein, a set of network configurations for providing differentiated QoS treatment to the GBR traffic is referred to as a GBR bearer. Similarly, a set of network configurations for providing differentiated QoS treatment to the non-GBR traffic is referred to as a non-GBR bearer.

The third-generation partnership project (3GPP) has established different non-GBR QoS class identifiers (QCIs) to further granularize QoS treatment of different types of non-GBR traffic, as shown in Table 1 below.

TABLE 1 non-GBR QCIs

| QCI | Priority | Packet Delay Budget | PER | Example Services |
|---|---|---|---|---|
| 6 | 6 | 300 ms | $10^{-6}$ | Video (buffered streaming), browsing, email |
| 7 | 7 | 100 ms | $10^{-3}$ | Video (live streaming), interactive gaming |
| 8 | 8 | 300 ms | $10^{-6}$ | Video (buffered streaming), browsing, email |
| 9 | 9 | 300 ms | $10^{-6}$ | Video (buffered streaming), browsing, email |

As shown in Table 1, non-GBR QCIs 6, 8, and 9 are associated with a more relaxed packet delay budget but a more stringent packet error rate (PER). In contrast, non-GBR QCI 7 is associated with a more stringent packet delay budget but a more relaxed PER. In this regard, each of the non-GBR QCIs 6, 7, 8, and 9 needs to be associated with a respective non-GBR bearer that defines a respective set of network configurations (e.g., priority) to enable a specific QoS treatment (e.g., packet delay budget) of the non-GBR QCI. As a result, the non-GBR QCIs 6, 7, 8, and 9 may need to be associated with four (4) different non-GBR bearers, respectively. In this regard, allocating the physical radio resource to the non-GBR QCIs can be equated with allocation of the physical radio resource to the respective non-GBR bearer.

In a non-limiting example, it is desirable to classify non-GBR traffic for internet browsing, file transfer, and email under different QCIs to receive more granularized QoS treatments. Given that the non-GBR traffic for internet browsing, file download, and email may each be identified by a respective logical channel, and more than one of the non-GBR traffic can be categorized under a same non-GBR QCI, each of the non-GBR QCIs 6, 7, 8, and 9 can end up being associated with one or more logical channels.

Like the DTCH, the logical channels associated with the non-GBR QCIs 6, 7, 8, and 9 may be mapped to the PDSCH as well. As such, it is necessary to further divide the RBs 202 of the PDSCH among the non-GBR QCIs 6, 7, 8, and 9. However, the 3GPP has not specified how to allocate the physical radio resource (e.g., the RBs 202) to different non-GBR QCIs associated with different non-GBR bearers. As such, it may be desired to allocate the physical radio resource to multiple non-GBR QCIs associated with multiple non-GBR bearers.

In this regard, FIG. 3 is a schematic diagram of an exemplary radio circuit 300 configured to enable physical radio resource allocation for non-GBR bearers. In a non-limiting example, the radio circuit 300 includes an interface circuit 302 and a processing circuit 304. The interface circuit 302 may be coupled to a service node 306, which can be a service provider and/or a network operator, as an example. The interface circuit 302 may be configured to communicate digital, analog, and/or optical communications signals with the service node 306. The processing circuit 304, which can be a field programmable gate array (FPGA), a system-on-chip (SoC), or a system-in-package (SiP), for example, may be configured to implement an acquiring module 308, a first calculating module 310, a second calculating module 312, a scheduling module 314, and a third calculating module 316.

Notably, the radio circuit 300 can be provided in a network node (e.g., base station, central unit, radio node, remote unit, etc.) that is configured to provide communication services (e.g., non-GBR services) in a number of coverage cells. In this regard, in examples discussed hereinafter, the radio circuit 300 is configured to perform physical radio resource allocation for non-GBR bearers on a per-coverage cell basis. Specifically, the radio circuit 300 can be configured to perform physical radio resource allocation for non-GBR bearers in any coverage cell based on a process, as discussed next with reference to FIG. 4.

Figure 4:
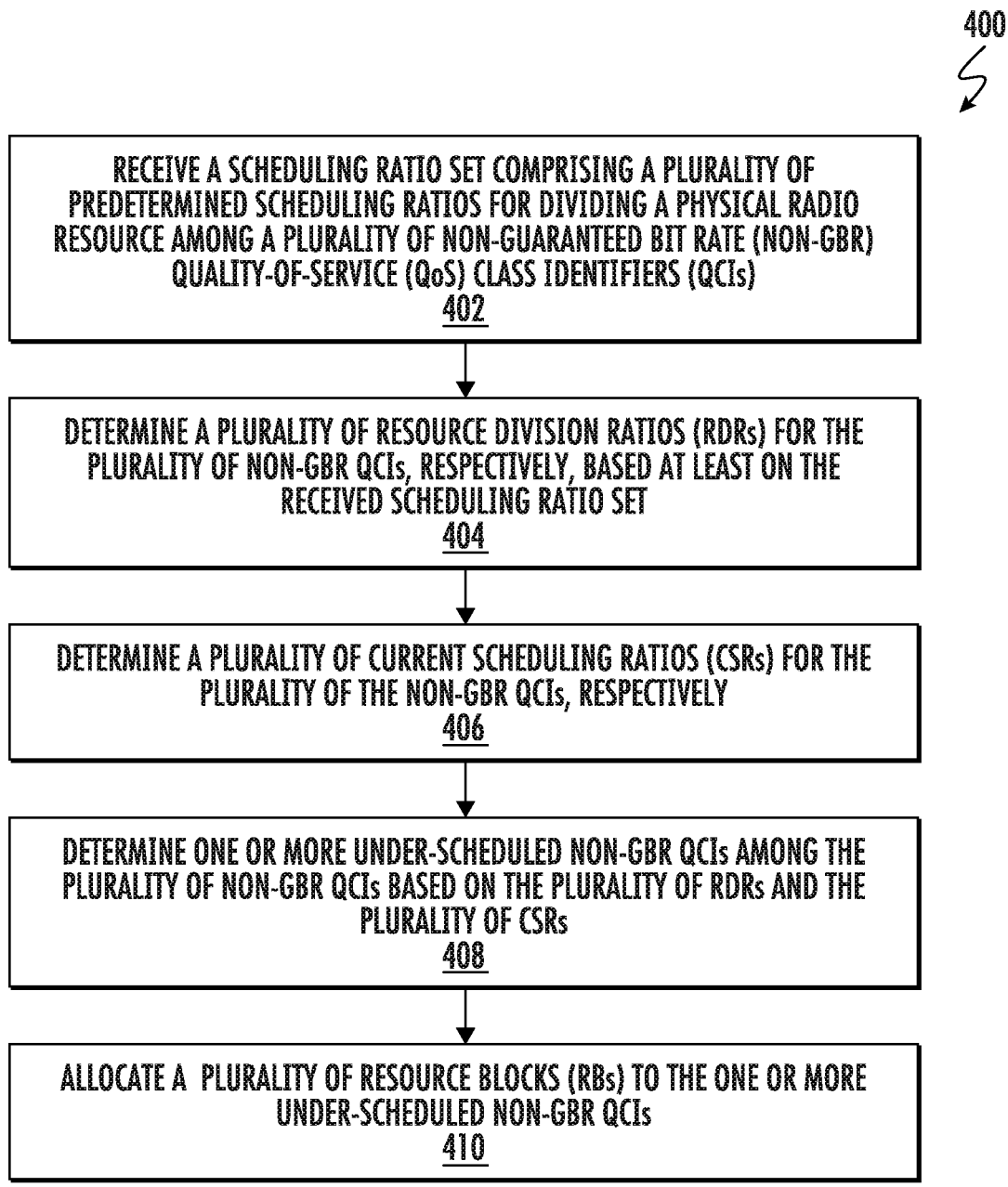
FIG. 4 is flowchart of an exemplary process, which can be employed by the radio circuit of FIG. 3 for allocating a physical radio resource to a non-GBR bearer in a DCS.

FIG. 4 is flowchart of an exemplary process 400, which can be employed by the radio circuit 300 of FIG. 3 for allocating the physical radio resource to the non-GBR bearer in a DCS. As discussed in detail below, the radio circuit 300 is configured to divide the physical radio resource as illustrated in FIG. 3 among a number of non-GBR QCIs based on a number of predetermined scheduling ratios. More specifically, the radio circuit 300 can dynamically rebalance physical radio resource allocation among the non-GBR QCIs such that the network node can maintain the predetermined scheduling ratios or respond to a reconfiguration of the predetermined scheduling ratios among the non-GBR QCIs. In a non-limiting example, the radio circuit 300 can increase physical radio resource allocation to an under-scheduled QCI(s), while temporarily suspending physical radio resource allocation to an over-scheduled QCI(s), to help rebalance the predetermined scheduling ratios. As a result, a network operator(s) (e.g., the service node 306) can dynamically adjust physical radio resource allocation among the non-GBR QCIs based on, for example, subscribers' network usage and plan limits, thus making it possible for the network operator(s) to customize QoS configuration to enable differentiated non-GBR services.

With reference to FIG. 4, the interface circuit 302 may receive a scheduling ratio set (e.g., from the service node 306) including a plurality of predetermined scheduling ratios for dividing the physical radio resource among a plurality of non-GBR QCIs (block 402). For the convenience of discussion, the non-GBR QCIs 6, 7, 8, and 9 as shown in Table 1 are referenced hereinafter as non-limiting examples of the non-GBR QCIs to whom the radio circuit 300 is configured to allocate the physical radio resource based on the process 400. It should be appreciated that the process 400 can also be employed for allocating the physical radio resource to a subset of the non-GBR QCIs 6, 7, 8, and 9. It should be further appreciated that the process 400 can also be employed for allocating the physical radio resource to additional non-GBR QCIs not listed in Table 1 (e.g., QCI 69 and 70) and/or new QCIs that may be defined in the future.

In examples discussed herein, the physical radio resource corresponds to the subcarriers 208(1)-208(M) along the frequency-domain axis 204 and the OFDM symbols 210(1)-210(N) along the time-domain axis 206 in FIG. 2. In this regard, the physical radio resource includes a plurality of RBs 202, which is the minimum unit for allocating the physical radio resource to the non-GBR QCIs 6, 7, 8, and 9.

According to previous discussions in FIG. 2, each of the non-GBR QCIs 6, 7, 8, and 9 can be assigned to represent one or more of the non-GBR traffic, such as internet browsing, video streaming, file downloading, and emailing traffic. Given that each of the non-GBR traffic is identified by a respective logical channel, each of the non-GBR QCIs 6, 7, 8, and 9 can be associated with one or more logical channels as a result.

In examples discussed herein, the scheduling ratio set includes four (4) predetermined scheduling ratios corresponding to the non-GBR QCIs 6, 7, 8, and 9, respectively. In a non-limiting example, the predetermined scheduling ratios are 8:4:2:1 for the non-GBR QCIs 6, 7, 8, and 9, respectively. In this regard, the non-GBR QCI 6 is slated to receive twice (2×) the physical radio resource allocation of the non-GBR QCI 7, four times (4×) the physical radio resource allocation of the non-GBR QCI 8, and eight times (8×) the physical radio resource allocation of the non-GBR QCI 9.

To be able to maintain the predetermined scheduling ratios among the non-GBR QCIs 6, 7, 8, and 9, the radio circuit 300 needs to dynamically identify an over-scheduled non-GBR QCI(s) and/or an under-scheduled non-GBR QCI(s) among the non-GBR QCIs 6, 7, 8, and 9. Herein, an over-scheduled non-GBR QCI is one of the non-GBR QCIs 6, 7, 8, and 9 that has received the physical radio resource allocation above the non-GBR QCI's respective scheduling ratio. In contrast, an under-scheduled non-GBR QCI is one of the non-GBR QCIs 6, 7, 8, and 9 that has received the physical radio resource allocation below the non-GBR QCI's respective scheduling ratio. As discussed below, the radio circuit 300 can determine the over-scheduled non-GBR QCI(s) and the under-scheduled non-GBR QCI(s) among the non-GBR QCIs 6, 7, 8, and 9 by calculating a respective resource division ratio (RDR) and a respective current scheduling ratio (CSR) for each of the non-GBR QCIs 6, 7, 8, and 9.

In this regard, the processing circuit 304 (e.g., the first calculating module 310) first determines a plurality of RDRs for the non-GBR QCIs 6, 7, 8, and 9, respectively, based at least on the received scheduling ratio set (block 404). As mentioned earlier, each of the non-GBR QCIs 6, 7, 8, and 9 can be assigned to represent one or more logical channels that identify one or more types of non-GBR traffic. In this regard, the processing circuit 304 first determines a number of active logical channels among the one or more logical channels associated with each of the plurality of non-GBR QCIs 6, 7, 8, and 9 in a selected coverage cell. Herein, an active logical channel refers to a logical channel that identifies non-GBR traffic having data to send over the air. In contrast, a non-active logical channel refers to a logical channel that identifies non-GBR traffic without data to send over the air.

Subsequently, the processing circuit 304 can determine the RDRs for the non-GBR QCIs 6, 7, 8, and 9 based on the received scheduling ratio set and the number of active logical channels associated with each of the non-GBR QCIs 6, 7, 8, and 9. In a non-limiting example, the processing circuit 304 can determine the RDRs for the non-GBR QCIs 6, 7, 8, and 9 based on an equation (Eq. 1) below.

$$RDR_i = (CR_i * LC_i) / \Sigma_i^N (CR_i * LC_i) (i=1,2,3,4) \qquad \text{(Eq. 1)}$$

In the equation (Eq. 1) above, $RDR_1$ represents a respective one of the RDRs. For example, $RDR_1$ represents the respective RDR for the non-GBR QCI 6, $RDR_2$ represents the respective RDR for the non-GBR QCI 7, $RDR_3$ represents the respective RDR for the non-GBR QCI 8, and $RDR_4$ represents the respective RDR for the non-GBR QCI 9.

$CR_i$ represents a respective one of the predetermined scheduling ratios in the scheduling ratio set for a respective one of the of non-GBR QCIs 6, 7, 8, and 9 corresponding to the respective one of the RDRs. For example, $CR_1$ represents the scheduling ratio (e.g., 8) for the non-GBR QCI 6 that corresponds to the $RDR_6$, $CR_2$ represents the scheduling ratio (e.g., 4) for the non-GBR QCI 7 that corresponds to the $RDR_7$, $CR_3$ represents the scheduling ratio (e.g., 2) for the non-GBR QCI 8 that corresponds to the $RDR_8$, and $CR_4$ represents the scheduling ratio (e.g., 1) for the non-GBR QCI 9 that corresponds to the $RDR_9$.

$LC_i$ represents the number of active logical channels among the logical channels associated with the respective one of the plurality of non-GBR QCIs 6, 7, 8, and 9. For example, $LC_1$ represents the number of active logical channels associated with the non-GBR QCI 6 in the selected coverage cell, $LC_2$ represents the number of active logical channels associated with the non-GBR QCI 7 in the selected coverage cell, $LC_3$ represents the number of active logical channels associated with the non-GBR QCI 8 in the selected coverage cell, and $LC_4$ represents the number of active logical channels associated with the non-GBR QCI 9 in the selected coverage cell.

N represents a total number of the non-GBR QCIs 6, 7, 8, and 9. In examples discussed herein, N equals 4 (N=4). For example, if there are 4 active logical channels associated with each of the non-GBR QCIs 6, 7, 8, and 9 ($LC_1$=$LC_2$=$LC_3$=$LC_4$=4), then $RDR_1$ for the non-GBR QCI 6 can be determined based on the equation (Eq. 1) as $RDR_1$=(8*4)/(8*4+4*4+2*4+1*4)=53.3%. In a non-limiting example, the processing circuit 304 can recalculate the RDRs in response to a reconfiguration to any of the predetermined scheduling ratios in the scheduling ratio set, thus making it possible for the network operator(s) to dynamically adjust the scheduling ratio set.

The processing circuit 304 (e.g., the second calculating module 312) then determines a plurality of CSRs for the non-GBR QCIs 6, 7, 8, and 9, respectively (block 406). The processing circuit 304 first obtains a respective number of the RBs 202 in FIG. 2 that are allocated to each of the non-GBR QCIs 6, 7, 8, and 9. In a non-limiting example, the processing circuit 304 can obtain the respective number of the RBs 202 that are allocated to each of the non-GBR QCIs 6, 7, 8, and 9 from the service node 306 via the interface circuit 302. The processing circuit 304 then determines a respective one of the CSRs for each of the non-GBR QCIs 6, 7, 8, and 9 based on the respective number of the RBs 202 allocated to the non-GBR QCI. In a non-limiting example, the processing circuit 304 can determine the CSRs for the non-GBR QCIs 6, 7, 8, and 9 based on an equation (Eq. 2) below.

$$CSR_i = TRS_i / \Sigma_i^N TRS_i (i=1,2,3,4) \quad \text{(Eq. 2)}$$

In the equation (Eq. 2) above, $CSR_i$ represents a respective one of the CSRs. For example, $CSR_1$ represents the respective CSR for the non-GBR QCI 6, $CSR_2$ represents the respective CSR for the non-GBR QCI 7, $CSR_3$ represents the respective CSR for the non-GBR QCI 8, and $CSR_4$ represents the respective CSR for the non-GBR QCI 9.

$TRS_i$ represents the respective number of the RBs 202 being allocated to a respective one of the non-GBR QCIs 6, 7, 8, and 9 that corresponds to the respective one of the CSRs. For example, $TRS_1$ represents the respective number of the RBs 202 being allocated to the non-GBR QCI 6 that corresponds to the $RDR_6$, $TRS_2$ represents the respective number of the RBs 202 being allocated to the non-GBR QCI 7 that corresponds to the $RDR_7$, $TRS_3$ represents the respective number of the RBs 202 being allocated to the non-GBR QCI 8 that corresponds to the $RDR_8$, and $TRS_4$ represents the respective number of the RBs 202 being allocated to the non-GBR QCI 9 that corresponds to the $RDR_9$.

N represents a total number of the non-GBR QCIs 6, 7, 8, and 9. In examples discussed herein, N equals 4 (N=4).

The processing circuit 304 subsequently determines one or more under-scheduled non-GBR QCIs among the non-GBR QCIs 6, 7, 8, and 9 based on the afore-determined RDRs and the afore-determined CSRs (block 408). In a non-limiting example, the processing circuit 304 can determine that a non-GBR QCI among the non-GBR QCIs 6, 7, 8, and 9 is under-scheduled if the respective $CSR_i$ is less than the respective $RDR_i$ of the non-GBR QCI. For example, if $CSR_1 < RDR_1$, it is an indication that the non-GBR QCI 6 is under-scheduled. In contrast, the processing circuit 304 can determine that a non-GBR QCI among the non-GBR QCIs 6, 7, 8, and 9 is over-scheduled if the respective $CSR_i$ is greater than the respective $RDR_i$ of the non-GBR QCI. For example, if $CSR_2 > RDR_2$, it is an indication that the non-GBR QCI 7 is over-scheduled.

To help maintain the predetermined scheduling ratios among the non-GBR QCIs 6, 7, 8, and 9, the processing circuit 304 may temporarily suspend physical radio resource allocation to the over-scheduled QCIs for a defined duration (e.g., a time slot) and allocate the physical radio resource only to the under-scheduled QCIs during the defined duration. The processing circuit 304 first calculates a total RDR of the under-scheduled non-GBR QCIs based on the logical channels associated with each of the under-scheduled non-GBR QCIs. In a non-limiting example, the processing circuit 304 can calculate the total RDR based on an equation (Eq. 3) below.

$$rRDR_{total} = \Sigma_j^M rRDR_j (1 \leq j \leq 4) \quad \text{(Eq. 3)}$$

In the equation (Eq. 3) above, $rRDR_{total}$ represents the total RDR of the under-scheduled non-GBR QCIs among the non-GBR QCIs 6, 7, 8, and 9. $rRDR_j$ represents a respective RDR of any of the under-scheduled non-GBR QCIs. M represents a total number of the under-scheduled non-GBR QCIs. In examples discussed herein, M≤4.

Notably, the $rRDR_i$ of a respective under-scheduled non-GBR QCI is calculated only based on active logical channels in the non-GBR QCI, as shown in equation (Eq. 4) below.

$$rRDR_j = (CR_j * LC_j) / \Sigma_j^M (CR_j * LC_j)(1 \leq j \leq 4) \quad \text{(Eq. 4)}$$

Notably, the equation (Eq. 4) may look similar to the equation (Eq. 1). The difference between the equations (Eq. 1 and 4) is that equation (Eq. 1) takes into account all of the non-GBR QCIs 6, 7, 8, and 9 (N=4) and equation (Eq. 4) only takes into account the under-scheduled non-GBR QCIs among the non-GBR QCIs 6, 7, 8, and 9 (M≤4). Accordingly, the processing circuit 304 is able to recalculate the RDRs in response to a change in the number of active logical channels among the logical channels associated with any of the non-GBR QCIs 6, 7, 8, and 9.

Subsequently, the processing circuit 304 may allocate the RBs 202 available in the OFDM time-frequency grid 200 of FIG. 2 to the under-scheduled non-GBR QCIs (block 410). In a non-limiting example, the processing circuit 304 can allocate the RBs 202 to each of the under-scheduled non-GBR QCIs based on an equation (Eq. 5) below.

$$NPRB_j = NPRB_{avail} * (rRDR_j / rRDR_{total})(1 \leq j \leq 4) \quad \text{(Eq. 5)}$$

In the equation (Eq. 5) above, $NPRB_j$ represents a number of the RBs 202 allocated to a respective one of the under-scheduled non-GBR QCIs. $NPRB_{avail}$ represents a total number of the RBs 202 available in the OFDM time-frequency grid 200.

Figure 5:
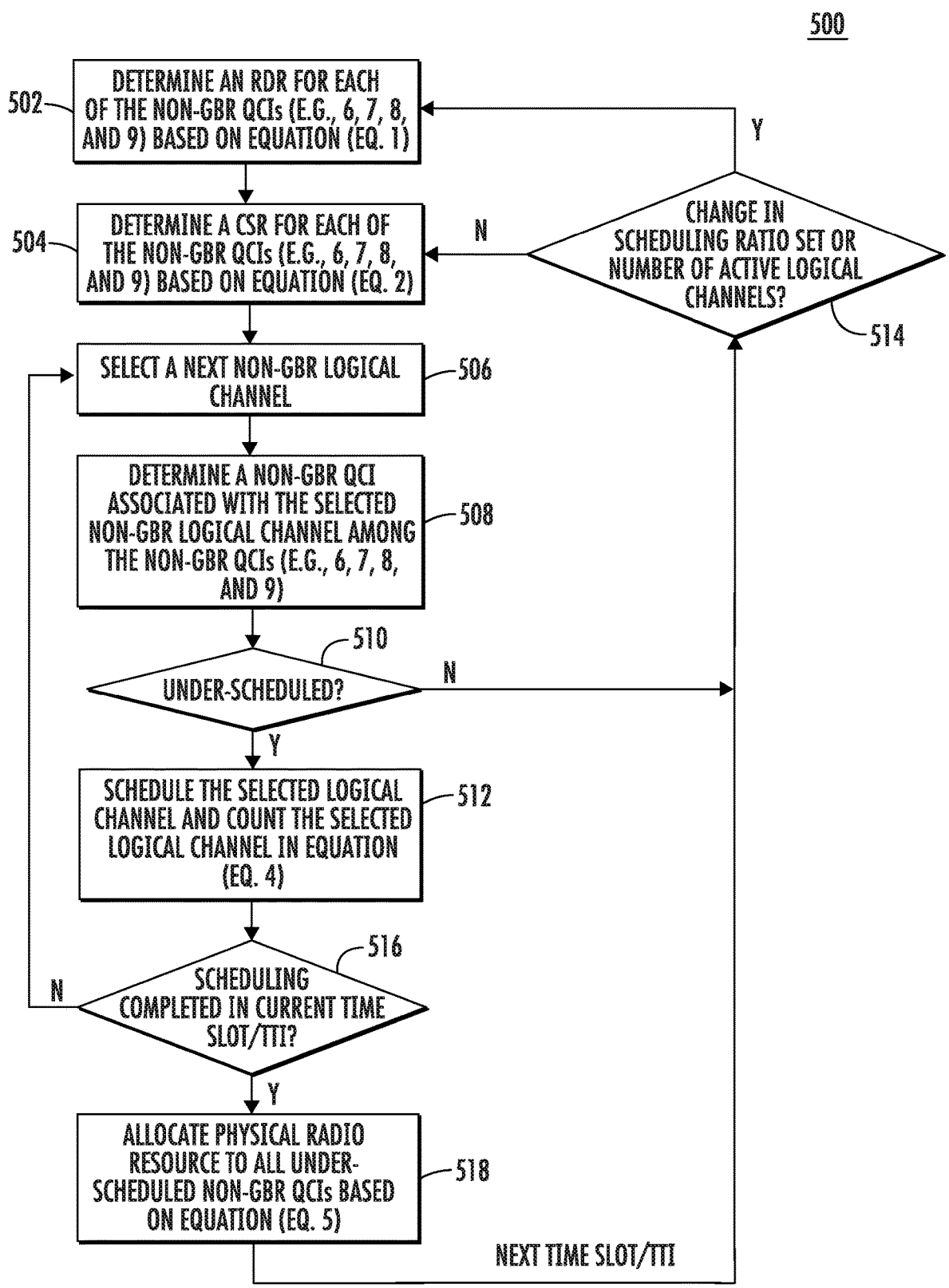
FIG. 5 is a flowchart of an exemplary process for allocating the physical radio resource to the non-GBR bearer periodically.

In one embodiment, the processing circuit 304 may be configured to perform physical radio resource allocation based on the process 400 periodically, such as in each time slot or transmit time interval (TTI). In this regard, FIG. 5 is a flowchart of an exemplary process 500 for allocating the physical radio resource to the non-GBR QCIs 6, 7, 8, and 9 periodically. By performing physical radio resource allocation periodically, the radio circuit 300 may be able to rebalance the predetermined scheduling ratios in a timely manner.

With reference to FIG. 5, in a current time slot/TTI, the processing circuit 304 determines an RDR for each of the non-GBR QCIs (e.g., 6, 7, 8, and 9) based on the equation (Eq. 1) (block 502). The processing circuit 304 then determines a CSR for each of the non-GBR QCIs (e.g., 6, 7, 8, and 9) based on the equation (Eq. 2) (block 504). The processing circuit 304 then selects a next non-GBR logical channel (e.g., from a scheduler) (bock 506). The processing circuit 304 then determines a non-GBR QCI associated with the selected logical channel among the non-GBR QCIs (e.g., 6, 7, 8, and 9) (block 508). The processing circuit 304 then checks whether the non-GBR QCI associated with the selected logical channel is under-scheduled (block 510). If the non-GBR QCI associated with the selected logical channel is under-scheduled, the processing circuit 304 schedules the selected logical channel and counts the selected logical channel in the equation (Eq. 4) (block 512). If the non-GBR QCI associated with the selected logical channel is over-scheduled, the processing circuit 304 checks whether there is a change in the scheduling ratio set or the number of active logical channels (block 514). The processing circuit 304 will proceed to block 502 if there is a change in the scheduling ratio set or the number of active logical channels. Otherwise, the processing circuit 304 will proceed to block 504.

In case the non-GBR QCI associated with the selected logical channel is under-scheduled and after scheduling the selected logical channel in block 512, the processing circuit 304 checks whether scheduling is completed in the current time slot/TTI (block 516). If the scheduling has not completed in the current time slot/TTI, the processing circuit 304 proceeds to block 506. Otherwise, the processing circuit 304 allocates the physical radio resource to all under-scheduled non-GBR QCIs based on the equation (Eq. 5) (block 518). The processing circuit 304 then proceeds to block 514 to start scheduling in a subsequent time slot/TTI.

Figure 6:
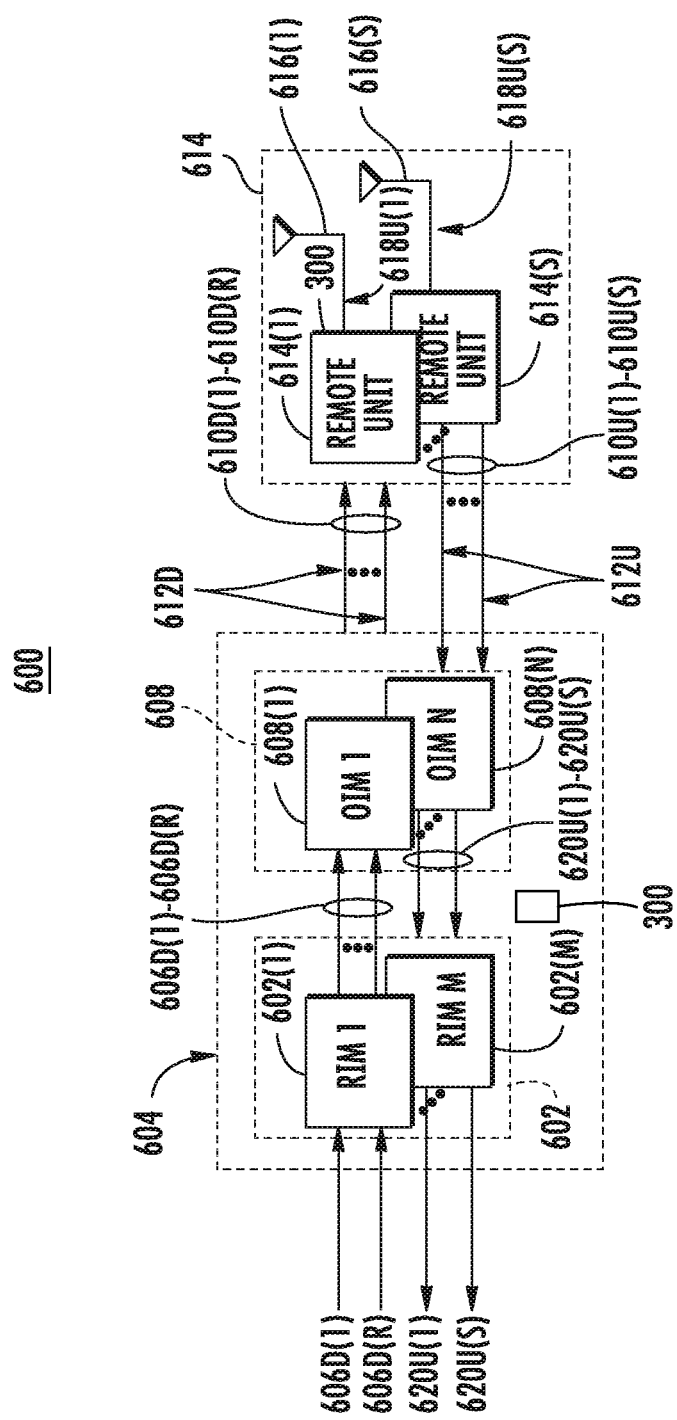
FIG. 6 is a schematic diagram of an exemplary wireless communications circuit (WCS) provided in the form of an optical fiber-based DCS that can include the radio circuit of FIG. 3 for allocating the physical radio resource to the non-GBR bearer.

FIG. 6 is a schematic diagram of an exemplary WCS 600 provided in the form of an optical fiber-based DCS that can include the radio circuit 300 of FIG. 3 for allocating the physical radio resource to the non-GBR bearer. The WCS 600 includes an optical fiber for distributing communications services for multiple frequency bands. The WCS 600 in this example is comprised of three (3) main components. A plurality of radio interfaces provided in the form of radio interface modules (RIMs) 602(1)-602(M) are provided in a central unit 604 to receive and process a plurality of downlink communications signals 606D(1)-606D(R) prior to optical conversion into downlink optical fiber-based communications signals. In a non-limiting example, the central unit 604 may be configured to include the radio circuit 300 of FIG. 3. The downlink communications signals 606D(1)-606D(R) may be received from a base station as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMs 602(1)-602(M) as modular components that can easily be installed and removed or replaced in the central unit 604. In one example, the central unit 604 is configured to support up to twelve (12) RIMs 602(1)-602(12). Each of the RIMs 602(1)-602(M) can be designed to support a particular type of radio source or range of radio sources (i.e., frequencies) to provide flexibility in configuring the central unit 604 and the WCS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMs 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMs 602(1)-602(M) may also be provided in the central unit 604 that supports any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink communications signals 606D(1)-606D(R) are provided to a plurality of optical interfaces provided in the form of optical interface modules (OIMs) 608(1)-608(N) in this embodiment to convert the downlink communications signals 606D(1)-606D(R) into a plurality of downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) converters ("first O/E converters") and electrical-to-optical (E/O) converters ("first E/O converters"), as will be described in more detail below. The OIMs 608(1)-608(N)

support the radio bands that can be provided by the RIMs 602(1)-602(M), including the examples previously described above.

The OIMs 608(1)-608(N) each include E/O converters to convert the downlink communications signals 606D(1)-606D(R) into the downlink optical fiber-based communications signals 610D(1)-610D(R). The downlink optical fiber-based communications signals 610D(1)-610D(R) are communicated over a downlink optical fiber-based communications medium 612D to a plurality of remote units 614(1)-614(S). The notation "1-S" indicates that any number of the referenced component 1-S may be provided. In a non-limiting example, any of the remote units 614(1)-614(S) can incorporate the radio circuit 300 of FIG. 3. Remote unit O/E converters provided in the remote units 614(1)-614(S) convert the downlink optical fiber-based communications signals 610D(1)-610D(R) back into the downlink communications signals 606D(1)-606D(R), which are then converted into a plurality of downlink RF communications signals and provided to antennas 616(1)-616(S) in the remote units 614(1)-614(S) to client devices in the reception range of the antennas 616(1)-616(S).

The remote units 614(1)-614(S) receive a plurality of uplink RF communications signals from the client devices through the antennas 616(1)-616(S). The remote units 614(1)-614(S) convert the uplink RF communications signals into a plurality of uplink communications signals 618U(1)-618U(S). Remote unit E/O converters ("second E/O converters") are also provided in the remote units 614(1)-614(S) to convert the uplink communications signals 618U(1)-618U(S) into a plurality of uplink optical fiber-based communications signals 610U(1)-610U(S). The remote units 614(1)-614(S) communicate the uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters ("second O/E converters") that convert the received uplink optical fiber-based communications signals 610U(1)-610U(S) into a plurality of uplink communications signals 620U(1)-620U(S), which are processed by the RIMs 602(1)-602(M) and provided as the uplink communications signals 620U(1)-620U(S). The central unit 604 may provide the uplink communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the downlink optical fiber-based communications signals 610D(1)-610D(R) and the uplink optical fiber-based communications signals 610U(1)-610U(S) on the same optical fiber-based communications medium.

Figure 7:
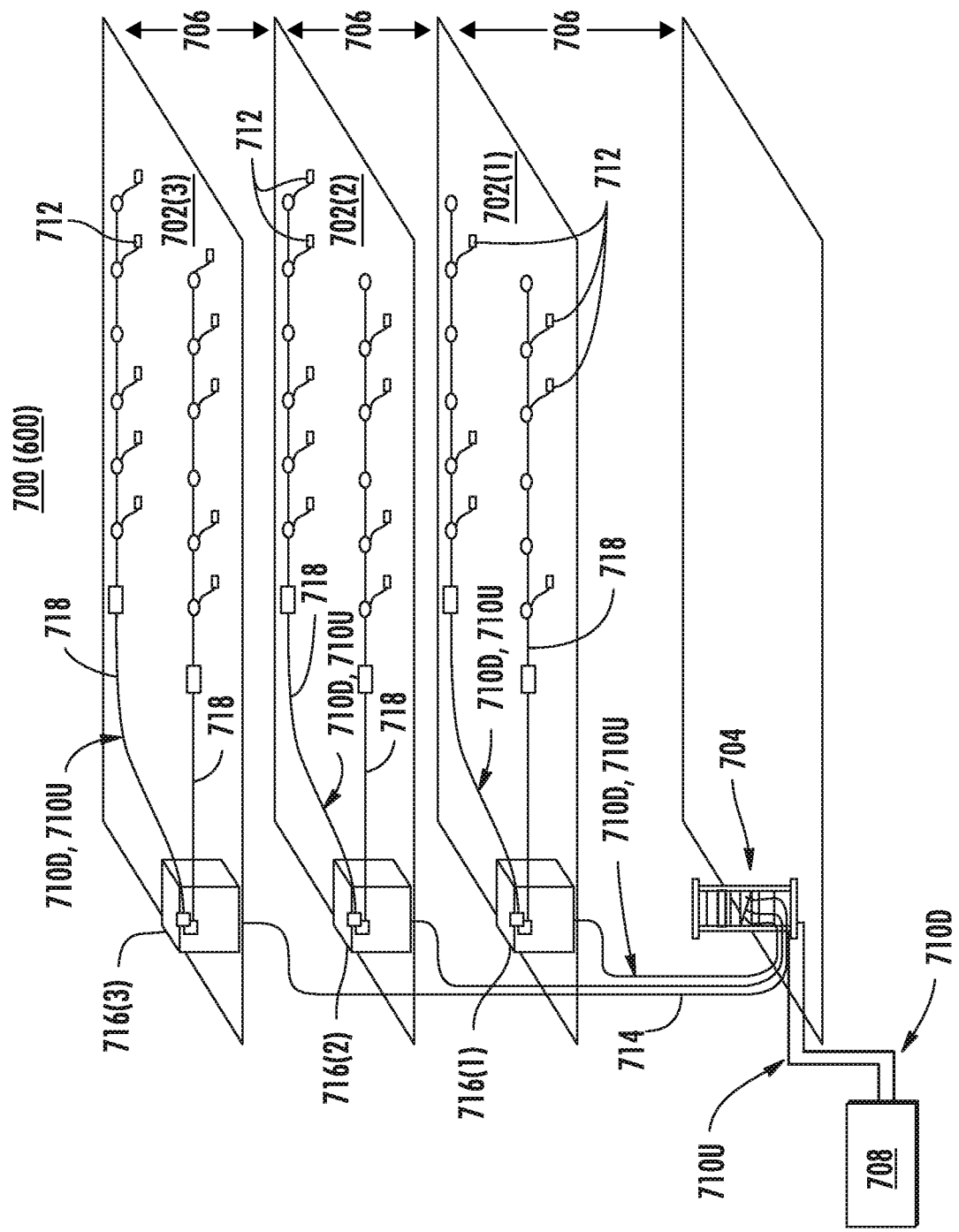
FIG. 7 is a partial schematic cut-away diagram of an exemplary building infrastructure including a WCS, such as the WCS of FIG. 6.

The WCS 600 in FIG. 6 can be provided in an indoor environment as illustrated in FIG. 7. FIG. 7 is a partial schematic cut-away diagram of an exemplary building infrastructure 700 including a WCS, such as the WCS 600 of FIG. 6. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

The radio circuit 300 of FIG. 3 configured to allocate the physical radio resource to the non-GBR bearer can also be interfaced with different types of radio nodes of service providers and/or supporting service providers, including macrocell systems, small cell systems, and remote radio heads (RRH) systems, as examples. For example, FIG. 8 is a schematic diagram of an exemplary mobile telecommunications environment 800 (also referred to as "environment 800") that includes the WCS 600 of FIG. 6 as an example.

The environment 800 includes exemplary macrocell RANs 802(1)-802(M) ("macrocells 802(1)-802(M)") and an exemplary small cell RAN 804 located within an enterprise environment 806 and configured to service mobile communications between user mobile communications devices 808(1)-808(N) to a mobile network operator (MNO) 810. In a non-limiting example, any of the macrocell RANs 802(1)-802(M) and the small cell RAN 804 can be configured to incorporate the radio circuit 300 of FIG. 3 to allocate the physical radio resource to the non-GBR bearer. A serving RAN for the user mobile communications devices 808(1)-808(N) is a RAN or cell in the RAN in which the user mobile communications devices 808(1)-808(N) have an established communications session with the exchange of mobile communications signals for mobile communications. Thus, a serving RAN may also be referred to herein as a serving cell. For example, the user mobile communications devices 808(3)-808(N) in FIG. 8 are being serviced by the small cell RAN 804, whereas user mobile communications devices 808(1) and 808(2) are being serviced by the macrocell 802. The macrocell 802 is an MNO macrocell in this example. However, a shared spectrum RAN 803 (also referred to as "shared spectrum cell 803") includes a macrocell in this example and supports communications on frequencies that are not solely licensed to a particular MNO, such as CBRS for example, and thus may service user mobile communications devices 808(1)-808(N) independent of a particular MNO. For example, the shared spectrum cell 803 may be operated by a third party that is not an MNO and wherein the shared spectrum cell 803 supports CBRS. Also, as shown in FIG. 8, the MNO macrocell 802, the shared spectrum cell 803, and/or the small cell RAN 804 can interface with a shared spectrum DCS 801 supporting coordination of distribution of shared spectrum from multiple service providers to remote units to be distributed to subscriber devices. The MNO macrocell 802, the shared spectrum cell 803, and the small cell RAN 804 may be neighboring radio access systems to each other, meaning that some or all can be in proximity to each other such that user mobile communications devices 808(3)-808(N) may be able to be in communications range of two or more of the MNO macrocell 802, the shared spectrum cell 803, and the small cell RAN 804 depending on the location of user mobile communications devices 808(3)-808(N).

Figure 8:
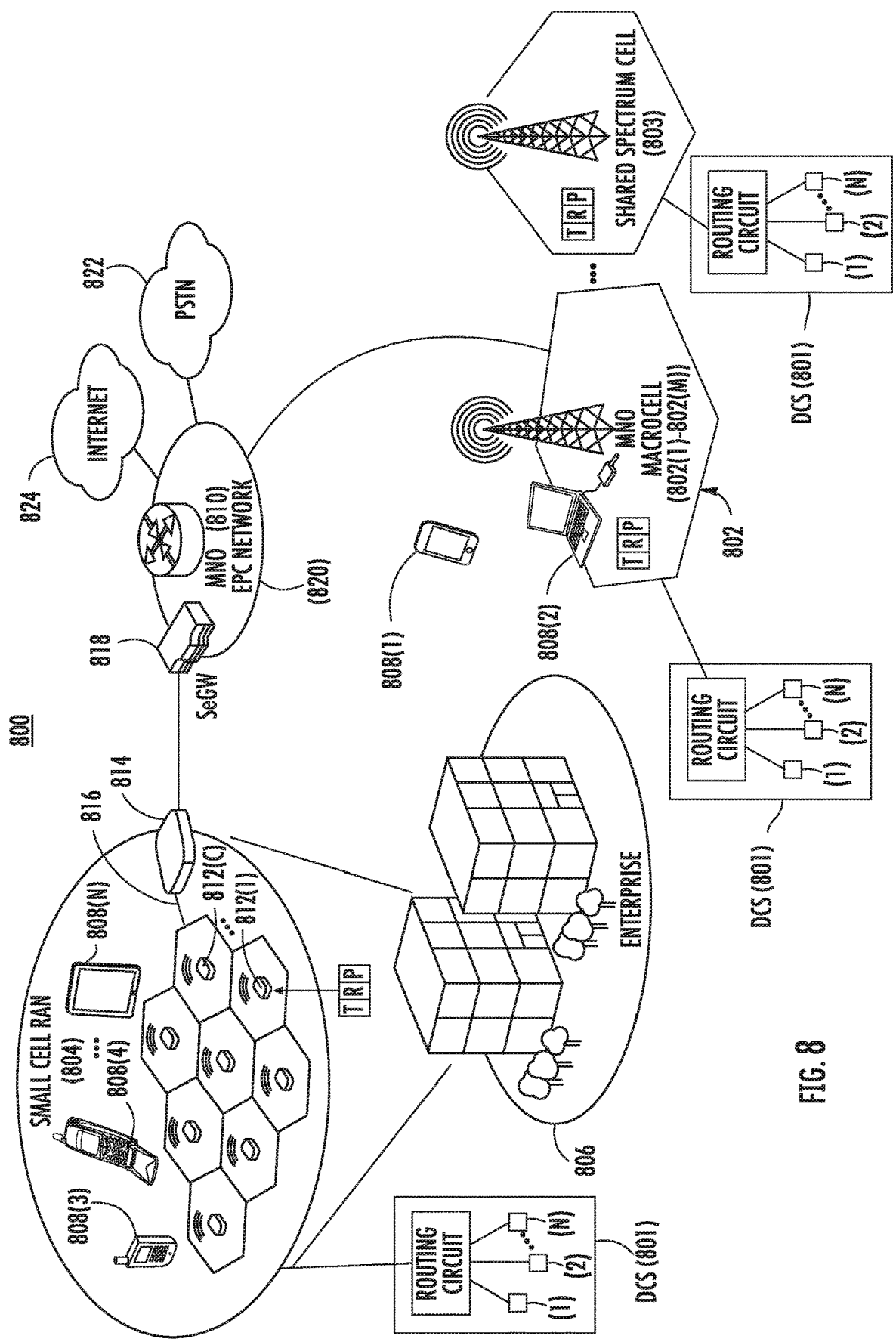
FIG. 8 is a schematic diagram of an exemplary mobile telecommunications environment that includes the WCS of FIG. 6.

In FIG. 8, the mobile telecommunications environment 800 in this example is arranged as an LTE system as described by the 3GPP as an evolution of the GSM/UMTS standards (Global System for Mobile communication/Universal Mobile Telecommunications System). It is emphasized, however, that the aspects described herein may also be applicable to other network types and protocols. The mobile telecommunications environment 800 includes the enterprise environment 806 in which the small cell RAN 804 is implemented. The small cell RAN 804 includes a plurality of small cell radio nodes 812(1)-812(C). Each small cell radio node 812(1)-812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 8, the small cell RAN 804 includes one or more services nodes (represented as a single services node 814) that manage and control the small cell radio nodes 812(1)-812(C). In alternative implementations, the management and control functionality may be incorporated into a radio node, distributed among nodes, or implemented remotely (i.e., using infrastructure external to the small cell RAN 804). The small cell radio nodes 812(1)-812(C) are coupled to the services node 814 over a direct or local area network (LAN) connection 816 as an example, typically using secure IPsec tunnels. The small cell radio nodes 812(1)-812(C) can include multi-operator radio nodes. The services node 814 aggregates voice and data traffic from the small cell radio nodes 812(1)-812(C) and provides connectivity over an IPsec tunnel to a security gateway (SeGW) 818 in a network 820 (e.g., evolved packet core (EPC) network in a 4G network, or 5G Core in a 5G network) of the MNO 810. The network 820 is typically configured to communicate with a public switched telephone network (PSTN) 822 to carry circuit-switched traffic, as well as for communicating with an external packet-switched network such as the Internet 824.

The environment 800 also generally includes a node (e.g., eNodeB or gNodeB) base station, or "macrocell" 802. The radio coverage area of the macrocell 802 is typically much larger than that of a small cell where the extent of coverage often depends on the base station configuration and surrounding geography. Thus, a given user mobile communications device 808(3)-808(N) may achieve connectivity to the network 820 (e.g, EPC network in a 4G network, or 5G Core in a 5G network) through either a macrocell 802 or small cell radio node 812(1)-812(C) in the small cell RAN 804 in the environment 800.

Figure 9:
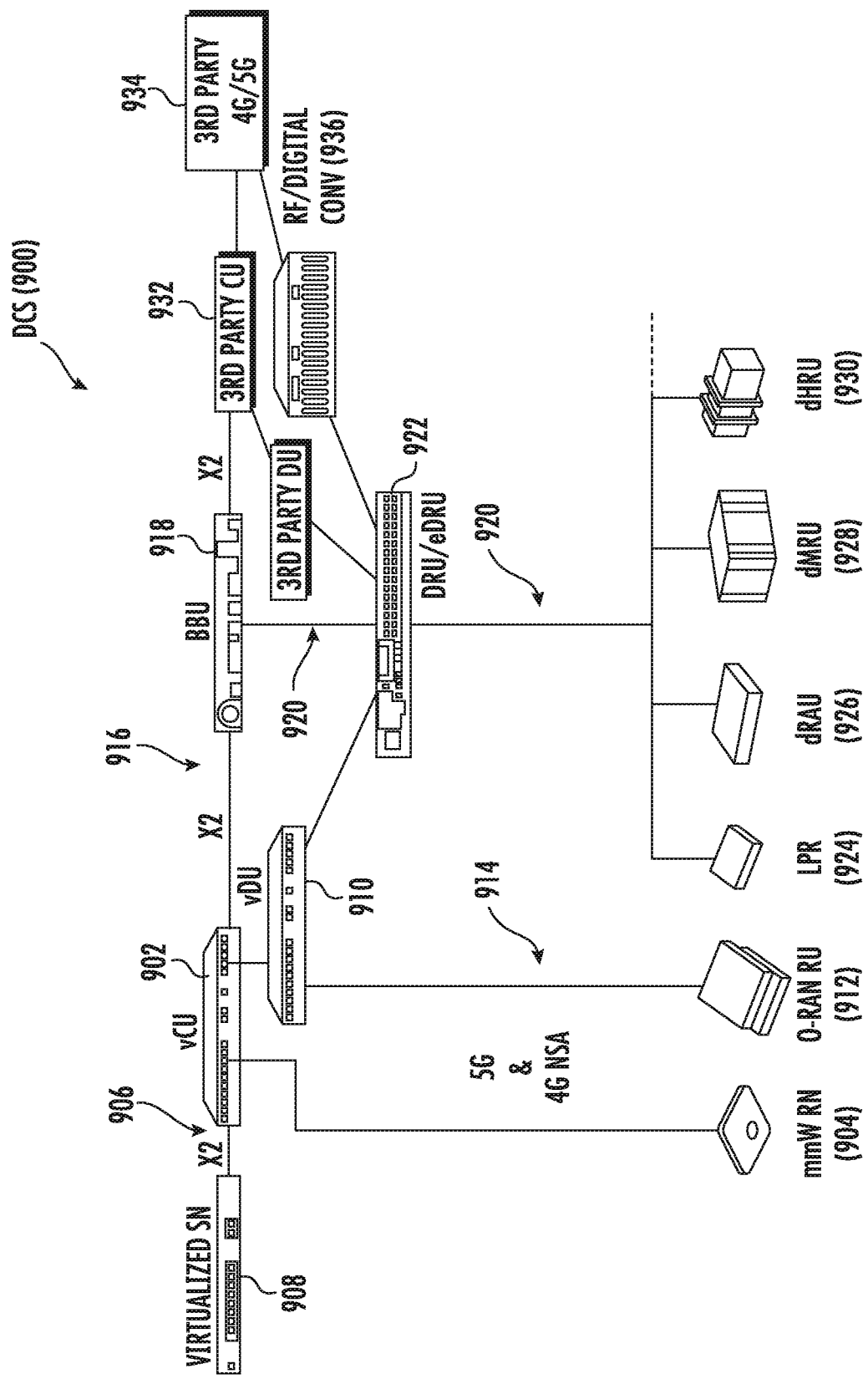
FIG. 9 is a schematic diagram of an exemplary distributed communications system that supports fourth generation (4G) and fifth generation (5G) communications services, and wherein any of the radio nodes can be configured to perform RF-based ranging and imaging in the wireless communications cell.

FIG. 9 is a schematic diagram of another exemplary DCS 900 that supports 4G and 5G communications services, and wherein any of the radio nodes can be configured to provide feedbackless interference estimation and suppression, according to any of the embodiments herein. The DCS 900 supports both legacy 4G LTE, 4G/5G non-standalone (NSA), and 5G communications systems. As shown in FIG. 9, a centralized services node 902 is provided that is configured to interface with a core network to exchange communications data and distribute the communications data as radio signals to remote units. In this example, the centralized services node 902 is configured to support distributed communications services to a millimeter wave (mmW) radio node 904. The functions of the centralized services node 902 can be virtualized through an x2 interface 906 to another services node 908. The centralized services node 902 can also include one or more internal radio nodes that are configured to be interfaced with a distribution node 910 to distribute communications signals for the radio nodes to an open RAN (O-RAN) remote unit 912 that is configured to be communicatively coupled through an O-RAN interface 914.

The centralized services node 902 can also be interfaced through an x2 interface 916 to a baseband unit (BBU) 918 that can provide a digital signal source to the centralized services node 902. The BBU 918 is configured to provide a signal source to the centralized services node 902 to provide radio source signals 920 to the O-RAN remote unit 912 as well as to a distributed router unit (DRU) 922 as part of a digital DAS. The DRU 922 is configured to split and distribute the radio source signals 920 to different types of remote units, including a lower power remote unit (LPR) 924, a radio antenna unit (dRAU) 926, a mid-power remote unit (dMRU) 928, and a high power remote unit (dHRU) 930. The BBU 918 is also configured to interface with a third party central unit 932 and/or an analog source 934 through an RF/digital converter 936.

Figure 10:
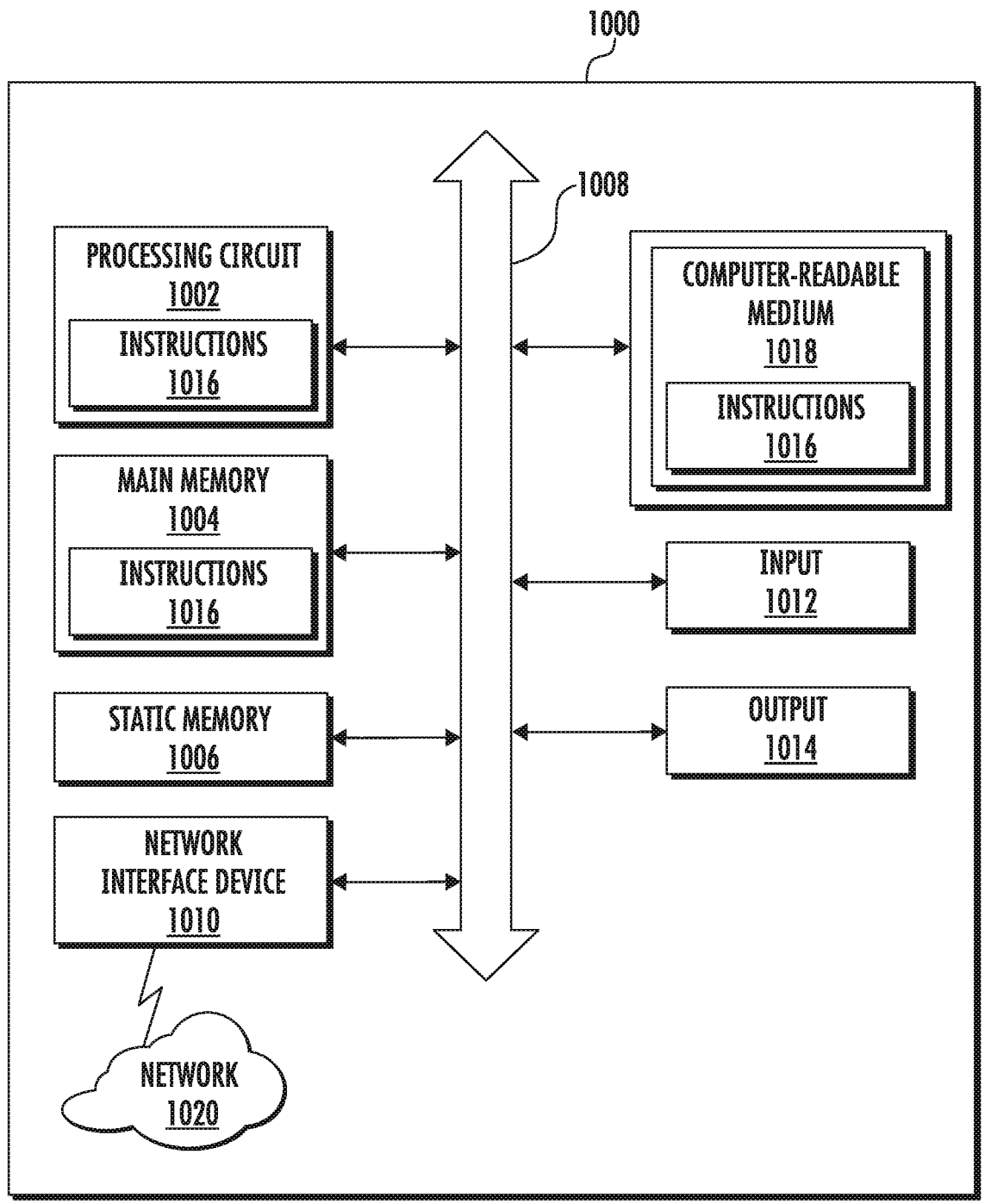
FIG. 10 is a schematic diagram of a representation of an exemplary computer system that can be included in or interface with any of the components in the radio circuit of FIG. 3, wherein the exemplary computer system is configured to execute instructions from an exemplary computer-readable medium.

Any of the circuits in the radio circuit 300 of FIG. 3 (e.g., the processing circuit 304) can include a computer system 1000, such as that shown in FIG. 10, to carry out their functions and operations. With reference to FIG. 10, the computer system 1000 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or the static memory 1006 directly or via some other connectivity means. The processing circuit 1002 may be a controller, and the main memory 1004 or the static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software. The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. A method for allocating a physical radio resource for a non-guaranteed bit rate (non-GBR) bearer in a distributed communications system (DCS), comprising:
  receiving a scheduling ratio set comprising a plurality of predetermined scheduling ratios indicative of target ratios for dividing the physical radio resource among a plurality of non-GBR quality-of-service (QoS) class identifiers (QCIs), wherein the physical radio resource comprises a plurality of resource blocks (RBs) and each of the plurality of non-GBR QCIs is associated with one or more logical channels;
  determining a plurality of resource division ratios (RDRs) for the plurality of non-GBR QCIs, respectively, based at least on the received scheduling ratio set;
  determining a plurality of current scheduling ratios (CSRs) indicative of current resource use levels for the plurality of non-GBR QCIs, respectively;
  determining one or more under-scheduled non-GBR QCIs among the plurality of non-GBR QCIs based on comparing the plurality of RDRs and the plurality of CSRs;

allocating the plurality of RBs to each of the one or more under-scheduled non-GBR QCIs; and determining any of the plurality of non-GBR QCIs as one of the one or more under-scheduled non-GBR QCIs if a respective one of the plurality of CSRs is less than a respective one of the plurality of RDRs.

2. The method of claim 1, further comprising:

determining one or more over-scheduled non-GBR QCIs among the plurality of non-GBR QCIs based on the plurality of RDRs and the plurality of CSRs; and suspending allocation of the plurality of RBs to each of the one or more over-scheduled non-GBR QCIs for a defined duration.

3. The method of claim 1, further comprising:

determining a number of active logical channels among the one or more logical channels associated with each of the plurality of non-GBR QCIs; and determining the plurality of RDRs for the plurality of non-GBR QCIs, respectively, based on the received scheduling ratio set and the number of active logical channels associated with each of the plurality of non-GBR QCIs.

4. The method of claim 3, further comprising determining the plurality of RDRs for the plurality of non-GBR QCIs, respectively, based on an equation expressed as: $RDR_i = (CR_i * LC_i)/\Sigma_i^N(CR_i * LC_i)$, wherein:

$RDR_i$ represents a respective one of the plurality of RDRs;

$CR_i$ represents a respective one of the plurality of predetermined scheduling ratios in the scheduling ratio set for a respective one of the plurality of non-GBR QCIs corresponding to the respective one of the plurality of RDRs;

$LC_i$ represents the number of active logical channels among the one or more logical channels associated with the respective one of the plurality of non-GBR QCIs; and N represents a total number of the plurality of non-GBR QCIs.

5. The method of claim 3, further comprising recalculating the plurality of RDRs in response to a change in the number of active logical channels among the one or more logical channels associated with any of the plurality of non-GBR QCIs.

6. The method of claim 1, further comprising recalculating the plurality of RDRs in response to a reconfiguration to the scheduling ratio set.

7. A method for allocating a physical radio resource for a non-guaranteed bit rate (non-GBR) bearer in a distributed communications system (DCS), comprising:

receiving a scheduling ratio set comprising a plurality of predetermined scheduling ratios indicative of target ratios for dividing the physical radio resource among a plurality of non-GBR quality-of-service (QoS) class identifiers (QCIs), wherein the physical radio resource comprises a plurality of resource blocks (RBs) and each of the plurality of non-GBR QCIs is associated with one or more logical channels;

determining a plurality of resource division ratios (RDRs) for the plurality of non-GBR QCIs, respectively, based at least on the received scheduling ratio set;

determining a plurality of current scheduling ratios (CSRs) indicative of current use levels for the plurality of non-GBR QCIs, respectively;

determining one or more under-scheduled non-GBR QCIs among the plurality of non-GBR QCIs based on comparing the plurality of RDRs and the plurality of CSRs;

allocating the plurality of RBs to each of the one or more under-scheduled non-GBR QCIs;

obtaining a respective number of the plurality of RBs allocated to each of the plurality of non-GBR QCIs; and determining a respective one of the plurality of CSRs for each of the plurality of non-GBR QCIs based on the respective number of the plurality of RBs allocated to each of the plurality of non-GBR QCIs.

8. The method of claim 7, further comprising determining the plurality of CSRs for the plurality of non-GBR QCIs, respectively, based on an equation expressed as: $CSR_i = TRS_i/\Sigma\ TRS_i$, wherein:

$CSR_i$ represents a respective one of the plurality of CSRs;

$TRS_i$ represents the respective number of the plurality of RBs allocated to a respective one of the plurality of non-GBR QCIs corresponding to the respective one of the plurality of CSRs; and N represents a total number of the plurality of non-GBR QCIs.

9. A method for allocating a physical radio resource for a non-guaranteed bit rate (non-GBR) bearer in a distributed communications system (DCS), comprising:

receiving a scheduling ratio set comprising a plurality of predetermined scheduling ratios indicative of target ratios for dividing the physical radio resource among a plurality of non-GBR quality-of-service (QoS) class identifiers (QCIs), wherein the physical radio resource comprises a plurality of resource blocks (RBs) and each of the plurality of non-GBR QCIs is associated with one or more logical channels;

determining a plurality of resource division ratios (RDRs) for the plurality of non-GBR QCIs, respectively, based at least on the received scheduling ratio set;

determining a plurality of current scheduling ratios (CSRs) indicative of current use levels for the plurality of non-GBR QCIs, respectively;

determining one or more under-scheduled non-GBR QCIs among the plurality of non-GBR QCIs based on comparing the plurality of RDRs and the plurality of CSRs;

allocating the plurality of RBs to each of the one or more under-scheduled non-GBR QCIs;

calculating a total RDR of the one or more under-scheduled non-GBR QCIs based on the one or more logical channels associated with each of the one or more under-scheduled non-GBR QCIs; and dividing the plurality of RBs among the one or more under-scheduled non-GBR QCIs based on the total RDR.

10. The method of claim 9, further comprising determining the total RDR for the one or more under-scheduled non-GBR QCIs based on an equation expressed as: $rRDR_{total} = \Sigma_j^M rRDR_j$, wherein:

$rRDR_{total}$ represents the total RDR of the one or more under-scheduled non-GBR QCIs;

$rRDR_j$ represents a respective RDR of any of the one or more under-scheduled non-GBR QCIs; and M represents a total number of the one or more under-scheduled non-GBR QCIs.

11. The method of claim 10, further comprising dividing the plurality of RBs among the one or more under-scheduled non-GBR QCIs based on an equation expressed as:

$NPRB_j = NPRB_{avail} * (rRDR_j/rRDR_{total})$, wherein:

$NPRB_j$ represents a number of the plurality of RBs allocated to a respective one of the one or more under-scheduled non-GBR QCIs; and NPRB$_{avail}$ represents a total number of the plurality of RBs.

12. A distributed communications system (DCS), comprising:
a radio circuit, comprising:
an interface circuit configured to receive a scheduling ratio set comprising a plurality of predetermined scheduling ratios indicative of target ratios for dividing a physical radio resource among a plurality of non-guaranteed bit rate (non-GBR) quality-of-service (QoS) class identifiers (QCIs), wherein the physical radio resource comprises a plurality of resource blocks (RBs) and each of the plurality of non-GBR QCIs is associated with one or more logical channels; and
a processing circuit configured to:
determine a plurality of resource division ratios (RDRs) for the plurality of non-GBR QCIs, respectively, based at least on the received scheduling ratio set;
determine a plurality of current scheduling ratios (CSRs) indicative of current use levels for the plurality of non-GBR QCIs, respectively;
determine one or more under-scheduled non-GBR QCIs among the plurality of non-GBR QCIs based on comparing the plurality of RDRs and the plurality of CSRs;
allocate the plurality of RBs to each of the one or more under-scheduled non-GBR QCIs;
determine a number of active logical channels among the one or more logical channels associated with each of the plurality of non-GBR QCIs; and
determine the plurality of RDRs for the plurality of non-GBR QCIs, respectively, based on the received scheduling ratio set and the number of active logical channels associated with each of the plurality of non-GBR QCIs.

13. The DCS of claim 12, wherein the processing circuit is further configured to:
determine one or more over-scheduled non-GBR QCIs among the plurality of non-GBR QCIs based on the plurality of RDRs and the plurality of CSRs; and
suspend allocation of the plurality of RBs to each of the one or more over-scheduled non-GBR QCIs for a defined duration.

14. The DCS of claim 12, wherein the processing circuit is further configured to determine the plurality of RDRs for the plurality of non-GBR QCIs, respectively, based on an equation expressed as: $RDR_i=(CR_i*LC_i)/\Sigma_i^N (CR_i*LC_i)$, wherein:
RDR$_i$ represents a respective one of the plurality of RDRs;
CR$_i$ represents a respective one of the plurality of predetermined scheduling ratios in the scheduling ratio set for a respective one of the plurality of non-GBR QCIs corresponding to the respective one of the plurality of RDRs;
LC$_i$ represents the number of active logical channels among the one or more logical channels associated with the respective one of the plurality of non-GBR QCIs; and
N represents a total number of the plurality of non-GBR QCIs.

15. The DCS of claim 12, wherein the processing circuit is further configured to recalculate the plurality of RDRs in response to a change in the number of active logical channels among the one or more logical channels associated with any of the plurality of non-GBR QCIs.

16. The DCS of claim 12, wherein the processing circuit is further configured to:
obtain a respective number of the plurality of RBs allocated to each of the plurality of non-GBR QCIs; and
determine a respective one of the plurality of CSRs for each of the plurality of non-GBR QCIs based on the respective number of the plurality of RBs allocated to each of the plurality of non-GBR QCIs.

17. The DCS of claim 16, wherein the processing circuit is further configured to determine the plurality of CSRs for the plurality of non-GBR QCIs, respectively, based on an equation expressed as: $CSR_i=TRS_i/\Sigma_i^N TRS_i$, wherein:
CSR$_i$ represents a respective one of the plurality of CSRs;
TRS$_i$ represents the respective number of the plurality of RBs allocated to a respective one of the plurality of non-GBR QCIs corresponding to the respective one of the plurality of CSRs; and
N represents a total number of the plurality of non-GBR QCIs.

18. The DCS of claim 12, wherein the processing circuit is further configured to determine any of the plurality of non-GBR QCIs as one of the one or more under-scheduled non-GBR QCIs if a respective one of the plurality of CSRs is less than a respective one of the plurality of RDRs.

19. The DCS of claim 12, wherein the processing circuit is further configured to recalculate the plurality of RDRs in response to a reconfiguration to the scheduling ratio set.

20. The DCS of claim 12, further comprising:
a central unit comprising the radio circuit, the central unit configured to distribute a plurality of downlink communications signals and receive a plurality of uplink communications signals; and
a plurality of remote units each configured to:
distribute a respective one of the plurality of downlink communications signals based on one or more of the plurality of non-GBR QCIs; and
provide a respective one of the plurality of uplink communications signals to the central unit based on the one or more of the plurality of non-GBR QCIs.

21. The DCS of claim 20, wherein:
the central unit comprises:
one or more first electrical-to-optical (E/O) converters configured to convert the plurality of downlink communications signals into a plurality of downlink optical communications signals; and
one or more first optical-to-electrical (O/E) converters configured to convert a plurality of uplink optical communications signals into the plurality of uplink communications signals; and
the plurality of remote units each comprises:
a second O/E converter configured to convert a respective one of the plurality of downlink optical communications signals into a respective one of the plurality of downlink communications signals; and
a second E/O converter configured to convert a respective one of the plurality of uplink communications signals into a respective one of the plurality of uplink optical communications signals.

22. A distributed communications system (DCS), comprising:
a radio circuit, comprising:
an interface circuit configured to receive a scheduling ratio set comprising a plurality of predetermined scheduling ratios indicative of target ratios for dividing a physical radio resource among a plurality of non-guaranteed bit rate (non-GBR) quality-of-service (QoS) class identifiers (QCIs), wherein the physical radio resource comprises a plurality of resource blocks (RBs) and each of the plurality of non-GBR QCIs is associated with one or more logical channels; and a processing circuit configured to:
- determine a plurality of resource division ratios (RDRs) for the plurality of non-GBR QCIs, respectively, based at least on the received scheduling ratio set;
- determine a plurality of current scheduling ratios (CSRs) indicative of current use levels for the plurality of non-GBR QCIs, respectively;
- determine one or more under-scheduled non-GBR QCIs among the plurality of non-GBR QCIs based on comparing the plurality of RDRs and the plurality of CSRs;
- allocate the plurality of RBs to each of the one or more under-scheduled non-GBR QCIs;
- calculate a total RDR of the one or more under-scheduled non-GBR QCIs based on the one or more logical channels associated with each of the one or more under-scheduled non-GBR QCIs; and
- divide the plurality of RBs among the one or more under-scheduled non-GBR QCIs based on the total RDR.

23. The DCS of claim 22, wherein the processing circuit is further configured to determine the total RDR for the one or more under-scheduled non-GBR QCIs based on an equation expressed as: $rRDR_{total} = \Sigma_j^M rRDR_j$, wherein:
- $rRDR_{total}$ represents the total RDR of the one or more under-scheduled non-GBR QCIs;
- $rRDR_j$ represents a respective RDR of any of the one or more under-scheduled non-GBR QCIs; and
- M represents a total number of the one or more under-scheduled non-GBR QCIs.

24. The DCS of claim 23, wherein the processing circuit is further configured to divide the plurality of RBs among the one or more under-scheduled non-GBR QCIs based on an equation expressed as: $NPRB_j = NPRB_{avail} * (rRDR_j / rRDR_{total})$, wherein:
- $NPRB_j$ represents a number of the plurality of RBs allocated to a respective one of the one or more under-scheduled non-GBR QCIs; and
- $NPRB_{avail}$ represents a total number of the plurality of RBs.

* * * * *

UNITED STATES PATENT AND TRADEMARK OFFICE
CERTIFICATE OF CORRECTION

| | | |
|---|---|---|
| PATENT NO. | : 11,570,655 B2 | |
| APPLICATION NO. | : 16/915462 | |
| DATED | : January 31, 2023 | |
| INVENTOR(S) | : Swami Dayal Srivastava | |

It is certified that error appears in the above-identified patent and that said Letters Patent is hereby corrected as shown below:

On the Title Page

In item (54), in Column 1, in "Title", Line 2, delete "NONGUARANTEED" and insert -- NON-GUARANTEED --.

In the Specification

In Column 1, Line 2, delete "NONGUARANTEED" and insert -- NON-GUARANTEED --.

In the Claims

In Column 20, Line 13, in Claim 8, delete "$TRS_i/\Sigma\ TRS_i,$" and insert -- $TRS_i/\Sigma_i^N\ TRS_i$, --.

In Column 21, Line 1, in Claim 11, delete "$NPRB_{avail}$represents" and insert -- $NPRB_{avail}$ represents --.

In Column 21, Line 54, in Claim 14, delete "$CR_i$," and insert -- $CR_i$ --.

In Column 21, Line 59, in Claim 14, delete "$LC_i$represents" and insert -- $LC_i$ represents --.

In Column 22, Line 15, in Claim 17, delete "$CSR_i$represents" and insert -- $CSR_i$ represents --.

In Column 22, Line 16, in Claim 17, delete "$TRS_i$represents" and insert -- $TRS_i$ represents --.

In Column 24, Line 22, in Claim 24, delete "$NPRB_{avail}$represents" and insert -- $NPRB_{avail}$ represents --.

Signed and Sealed this
Eighteenth Day of April, 2023

*Katherine Kelly Vidal*

Katherine Kelly Vidal
*Director of the United States Patent and Trademark Office*